US011294476B1

(12) United States Patent
Wuu et al.

(10) Patent No.: US 11,294,476 B1
(45) Date of Patent: Apr. 5, 2022

(54) MULTI-FUNCTIONAL CONTROL DEVICE WITH DISPLAY BUTTONS

(71) Applicant: NATIONAL CHUNG-HSING UNIVERSITY, Taichung (TW)

(72) Inventors: Dong-Sing Wuu, Taichung (TW); Ray-Hua Horng, Taichung (TW); Ken-Yen Chen, Taichung (TW); Tsing-Ping Liao, Taichung (TW)

(73) Assignee: NATIONAL CHUNG-HSING UNIVERSITY, Taichung (TW)

( * ) Notice: Subject to any disclaimer, the term of this patent is extended or adjusted under 35 U.S.C. 154(b) by 0 days.

(21) Appl. No.: 17/358,665

(22) Filed: Jun. 25, 2021

(30) Foreign Application Priority Data

Sep. 29, 2020 (TW) .................................. 109133910

(51) Int. Cl.
*G06F 3/02* (2006.01)
*H05B 45/10* (2020.01)
*H01H 13/83* (2006.01)

(52) U.S. Cl.
CPC ........... *G06F 3/0202* (2013.01); *H01H 13/83* (2013.01); *H05B 45/10* (2020.01)

(58) Field of Classification Search
CPC ........ G06F 3/0202; H01H 13/83; H05B 45/10
See application file for complete search history.

(56) References Cited

U.S. PATENT DOCUMENTS

| 7,423,557 | B2 | 9/2008 | Kang | |
| 10,592,004 | B1* | 3/2020 | Sun | ......................... H01H 13/83 |
| 11,211,212 | B2* | 12/2021 | Huang | ............... H01H 13/7065 |
| 2011/0127149 | A1* | 6/2011 | Sun | ......................... H01H 13/83 |
| | | | | 200/314 |
| 2019/0341204 | A1* | 11/2019 | Sun | ...................... H01H 13/023 |
| 2021/0183594 | A1* | 6/2021 | Lin | ......................... H01H 9/181 |

FOREIGN PATENT DOCUMENTS

| TW | I571794 B | 2/2017 |
| TW | I631540 B | 8/2018 |
| TW | M588936 U | 1/2020 |

* cited by examiner

*Primary Examiner* — Amit Chatly
(74) *Attorney, Agent, or Firm* — Osha Bergman Watanabe & Burton LLP (57) ABSTRACT

A multi-functional control device includes a casing unit, and press button modules disposed on a main circuit board in the casing unit. Each press button module includes a sub-circuit board connected to the main circuit board, a micro-contact switch mounted on the sub-circuit board, an auxiliary case removably mounted on the micro-contact switch, a driving circuit board removably disposed in the auxiliary case to connect the sub-circuit board, a display module removably disposed on the auxiliary case. A transparent cap covers the display module and the auxiliary case, and is detachably connected to the auxiliary case.

14 Claims, 13 Drawing Sheets

MULTI-FUNCTIONAL CONTROL DEVICE WITH DISPLAY BUTTONS

CROSS-REFERENCE TO RELATED APPLICATION

This application claims priority to Taiwanese Patent Application No. 109133910, filed on Sep. 29, 2020.

FIELD

The disclosure relates to a multi-functional control device, and more particularly to a multi-functional control device with display buttons.

BACKGROUND

Figure 1:
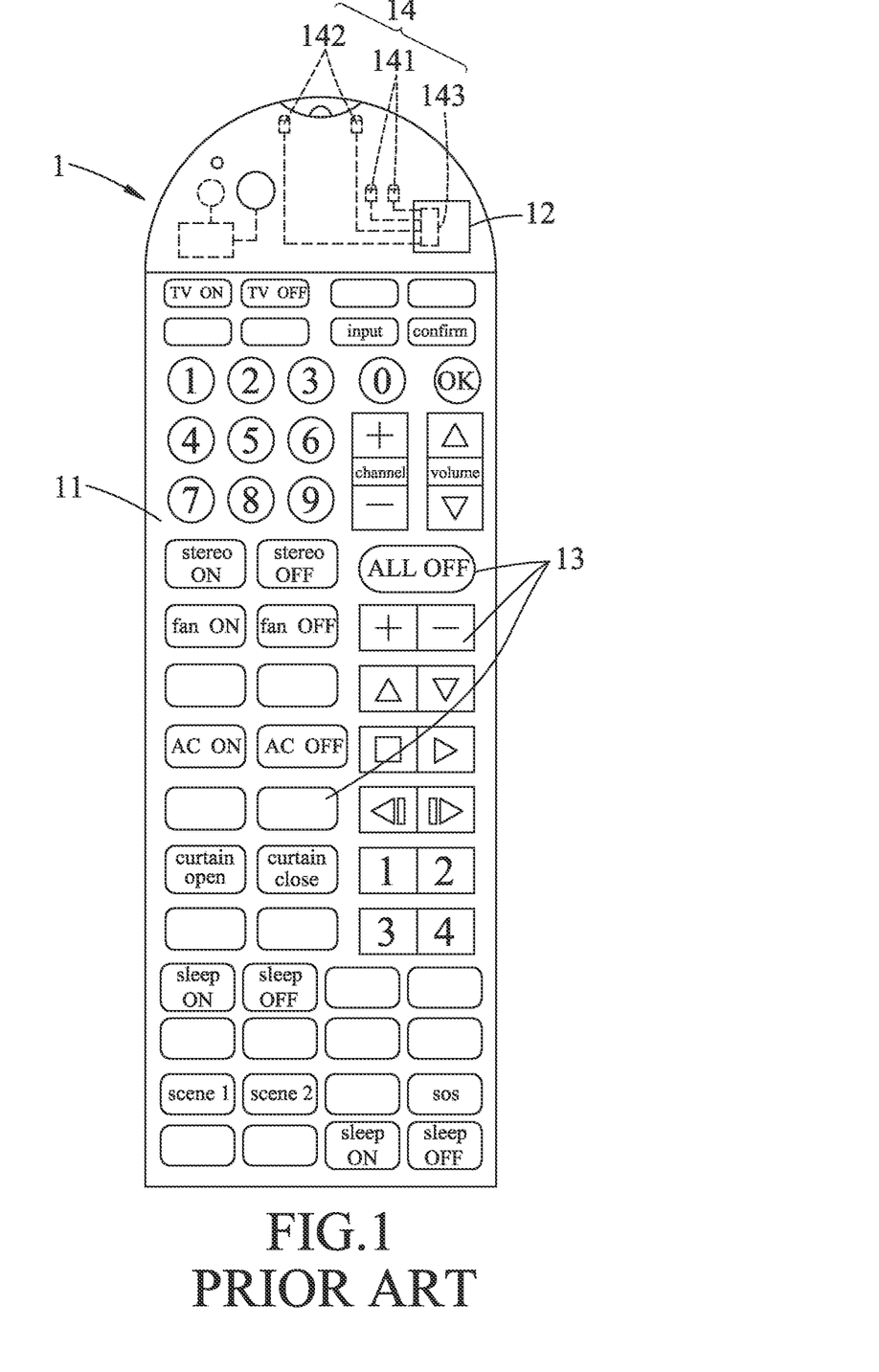
FIG. 1 is a top view illustrating a multi-functional control device, disclosed in Taiwanese Patent No. M588936U.

FIG. 1 shows a multi-functional control device 1 disclosed in Taiwanese Patent No. M588936U, which is used to control various electric devices, such as an air conditioner, a television, a ceiling fan, an electric rolling door, a stereo, and so on. The multi-functional control device 1 includes a casing 11, a learning key 12, functional keys 13, and a learning unit 14 disposed within the casing 11. The learning key 12 is pressed to activate the learning unit 14. The functional keys 13 are TV ON/OFF keys, an "Input" key, a "Confirm" key, numeric keys, channel adjustment keys, Volume Up/Down keys, and so on. The learning unit 14 includes a radio frequency module 141, an infrared module 142, and an integrated chip 143. The radio frequency and infrared modules 141, 142 not only transmit signals but also receive signals from the remote controls of the various electric devices. As the signal frequencies for controlling the various electric devices received by the radio frequency and infrared modules 141, 142 are stored in the integrated chip 143, the multi-functional control device 1 can remotely control the various electric devices. However, in order to control the various electric devices, the amount of the functional keys 13 is large and thus increases the size of the multi-functional control device 1. Further, because each functional key 13 is nonluminous, the multi-functional control device 1 is inconvenient to be used at night or in dark environment. In addition, each of the functional keys 13 is irreplaceable if damaged.

Figure 2:
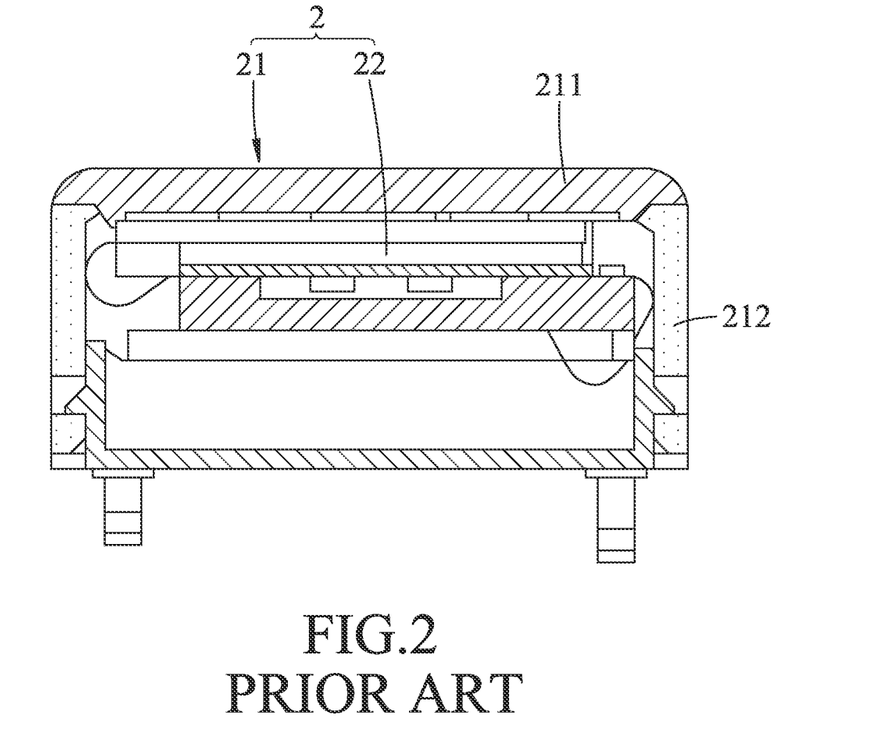
FIG. 2 is a sectional view illustrating a frameless display device, disclosed in Taiwanese Patent No. I631540B.

As shown in FIG. 2, a frameless display device 2, disclosed in Taiwanese Patent No. I631540B, includes a button 21 composed of a lens 211 and a button cover 212, and a display (e.g., a micro-led or an led display) module 22 disposed below the lens 211. The frameless display device 2 is usable for a miniature switch to display a required image on the miniature switch.

Figure 3:
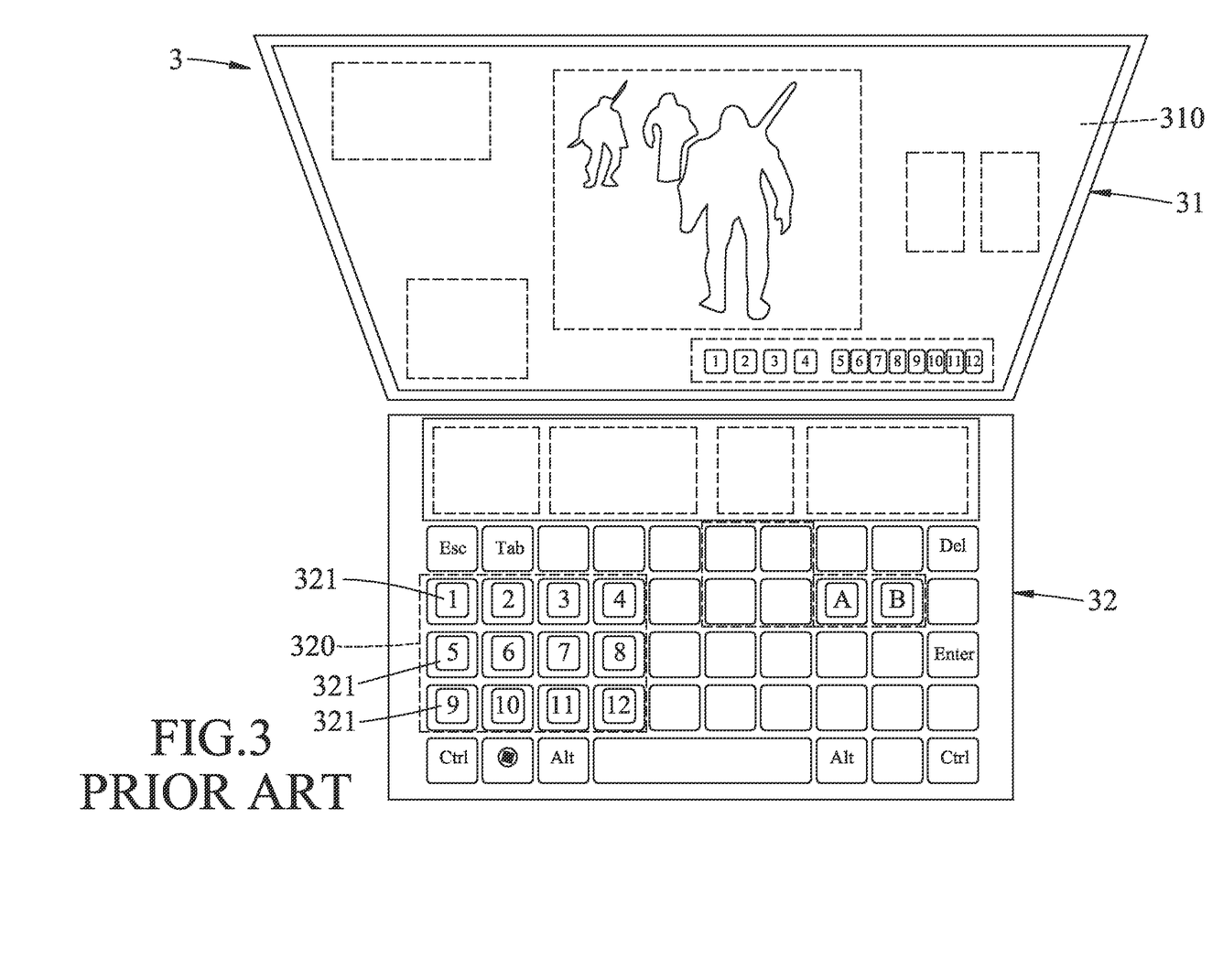
FIG. 3 is a schematic view illustrating a system 3, disclosed in Taiwanese Patent No. I571794B.

FIG. 3 illustrates a system 3, disclosed in Taiwanese Patent No. I571794B, for managing, selecting and updating a visual interface content. The system 3 includes a main display device 31 to display main visual interface contents 310, and a display-enabled input device 32 to display an adjunct visual interface contents 320. The display-enabled input device 32 includes a plurality of press buttons 321 each having a display (e.g., LCD or OLED) module. As the main visual interface contents 310 are changed ore updated, the image displayed on the press buttons 321 can be switched accordingly by the display-enabled input device 32. The system 3 is suitable for electric games or instant message application programs, and provides visualized information.

Figure 4:
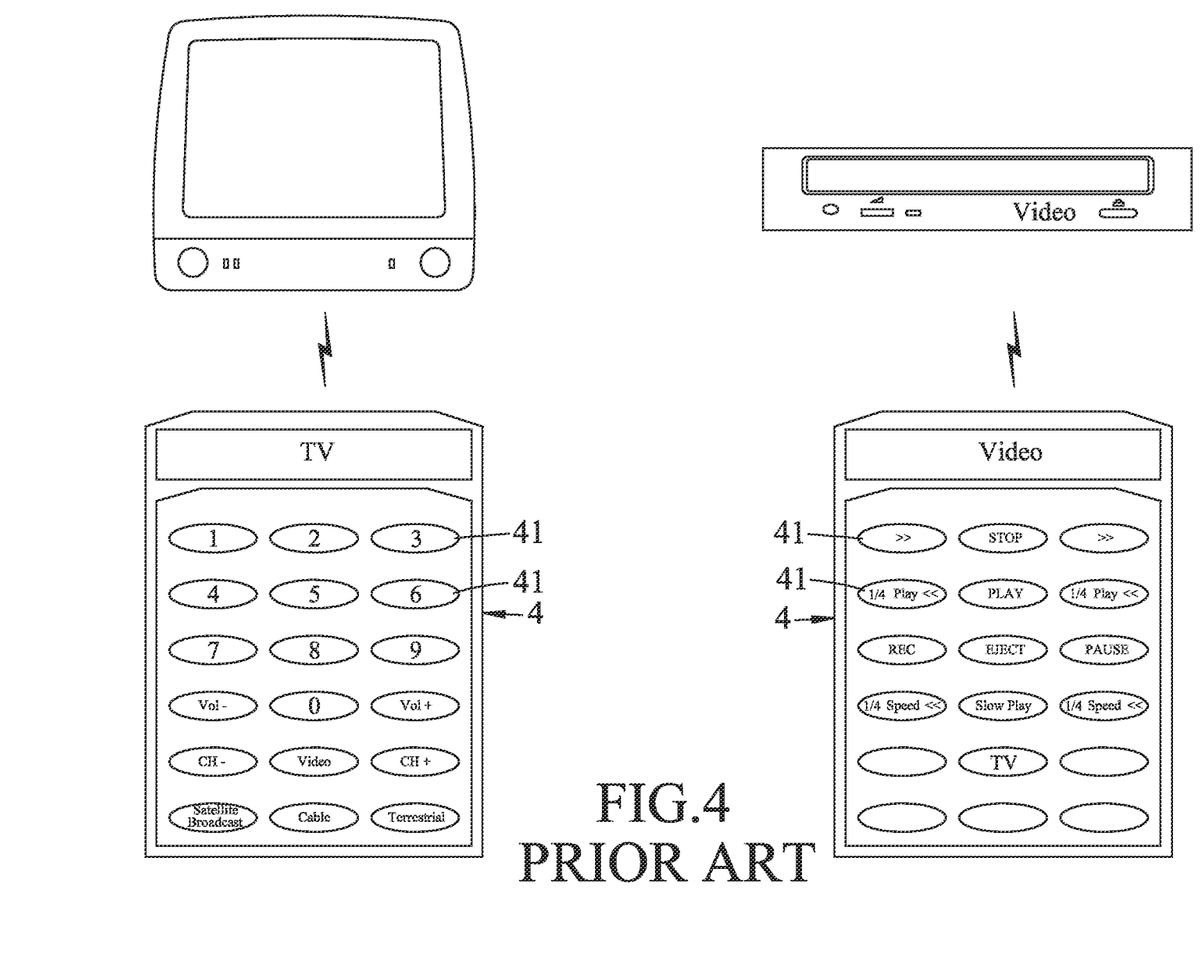
FIG. 4 is a schematic view illustrating a key input device, disclosed in U.S. Pat. No. 7,423,557 B2.

As shown in FIG. 4, a key input device 4, disclosed in U.S. Pat. No. 7,423,557 B2, includes a plurality of key display input units 41 and a display control unit (not shown). Each key display input unit 41 includes an electroluminescence (EL) device or an liquid crystal display (LCD) device to display an image or a character for identification. The display control unit (not shown) sets or changes the images or the characters displayed on the key input units 41. The key input device 4 is applied to a digital appliance (e.g., a cell phone) or a remote control. As shown in the left side of FIG. 4, the key input units 41 display the images or the characters to control a television. As shown in the left side of FIG. 4, the key input units 41 display the images or the characters to control a video player.

As described above, the display modules with the LCD, LED, EL, or OLED display are widely applied to miniature key display input units or press button assemblies of control devices. However, because the display module is not removable from the miniature key display input unit or the press button assembly, the miniature key display input unit or the press button assembly cannot function properly if the display module thereon is damaged.

SUMMARY

Therefore, an object of the present disclosure is to provide a multi-functional control device that can alleviate at least one of the drawbacks of the prior arts.

According to the disclosure, a multi-functional control device includes a casing unit, a main circuit board disposed within the casing unit, and a plurality of press button modules disposed on the main circuit board and spaced apart from each other. Each of the press button modules includes a sub-circuit board, a micro-contact switch, an auxiliary case, a driving circuit board, a display module, and a transparent cap.

The sub-circuit board is electrically connected to the main circuit board. The sub-circuit board has a circuitry plate provided with a control circuit, and an electrical connector electrically connected to the circuitry plate.

The micro-contact switch is mounted on the sub-circuit board.

The auxiliary case is removably mounted on top of and in contact with the micro-contact switch.

The driving circuit board is removably disposed in the auxiliary case, and has a mating connector mating with the electrical connector of the sub-circuit board to establish an electrical connection with the main circuit board.

The display module is removably disposed on top of the auxiliary case. The display module includes a micro light emitting diode array, and a flexible circuit board electrically bonded to the micro light emitting diode array and the driving circuit board. The flexible circuit board is configured to transmit a signal from the driving circuit board to the micro light emitting diode array for displaying an image.

The transparent cap covers the display module and the auxiliary case, and is detachably connected to the auxiliary case.

When the transparent cap is not pressed, the micro-contact switch opens the control circuit of the sub-circuit board.

When the transparent cap is pressed, the transparent cap presses the auxiliary case, which in turn presses the micro-contact switch so that the micro-contact switch closes the control circuit of the sub-circuit board.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 5:
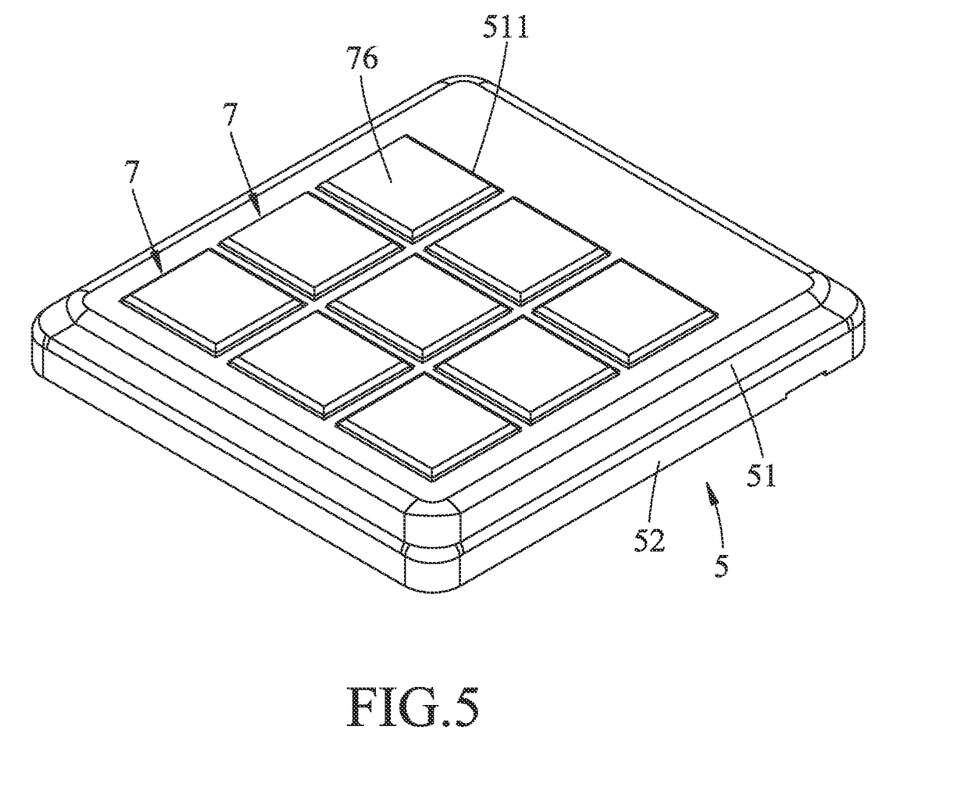
FIG. 5 is a perspective view illustrating a multi-functional control device according to an embodiment of the disclosure.
Figure 6:
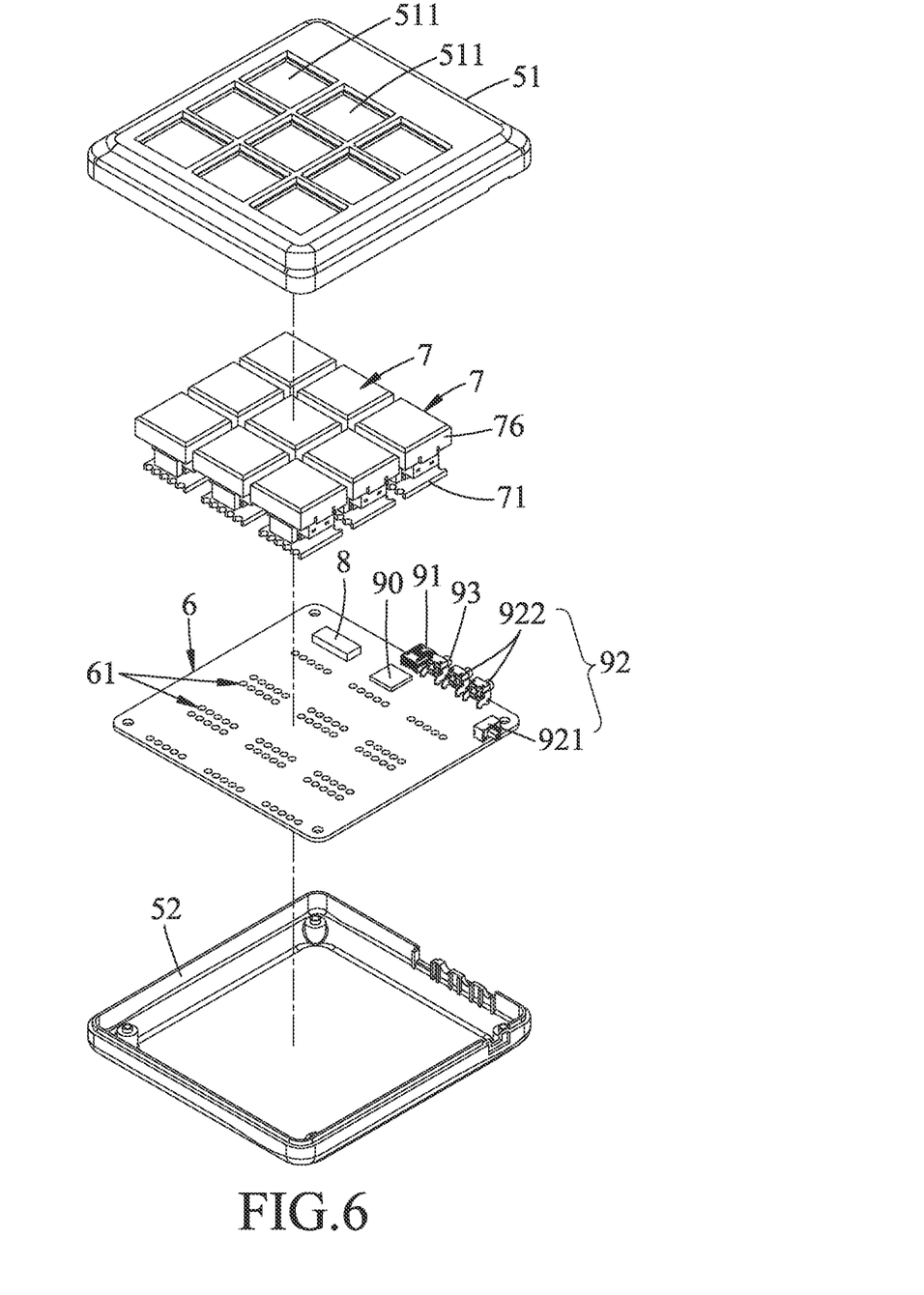
FIG. 6 is an exploded perspective view of the embodiment.

FIGS. 5 and 6 illustrate a multi-functional control device with display buttons according to an embodiment of the disclosure to remotely control various electrical products (not shown). The multi-functional control device includes a casing unit 5, a main circuit board 6, a plurality of press button modules 7, a signal transceiver unit 8, a control unit 90, a power supply device 91, an activator unit 92, and a brightness adjustment unit 93.

The casing unit 5 includes a top casing part 51 and a bottom casing part 52 connected to each other. The top casing part 51 has a plurality of through holes 511. The main circuit board 6 is situated in the bottom casing part 52 and has a plurality of solder pad arrays 61 spaced apart from each other.

Figure 7:
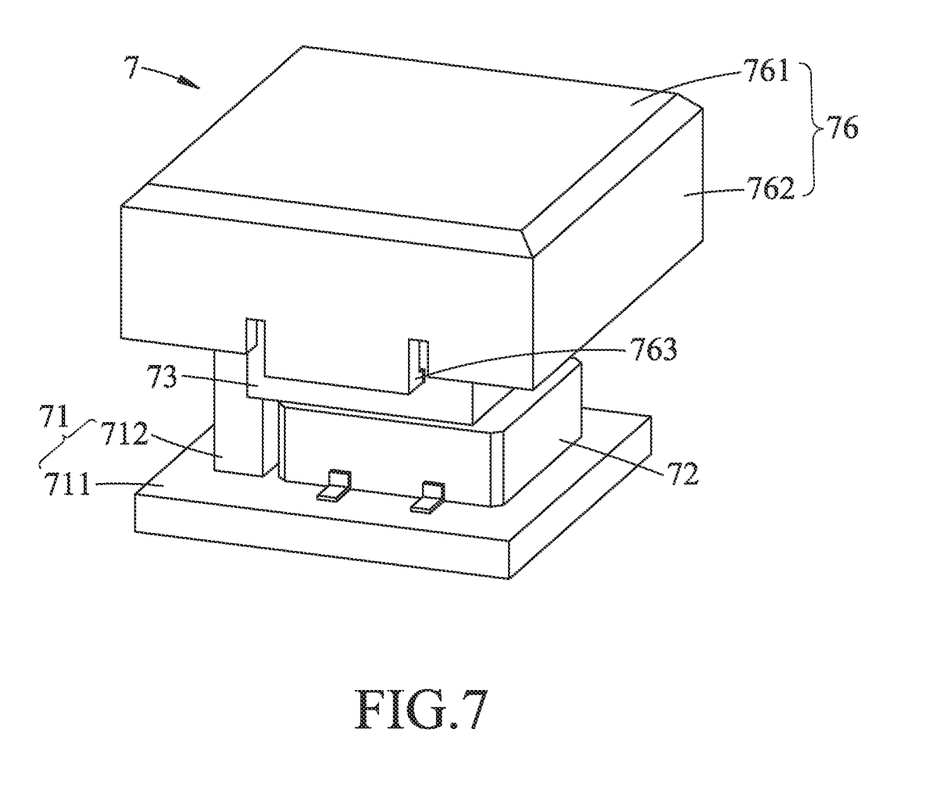
FIG. 7 is a perspective view of the embodiment illustrating a press button module.
Figure 8:
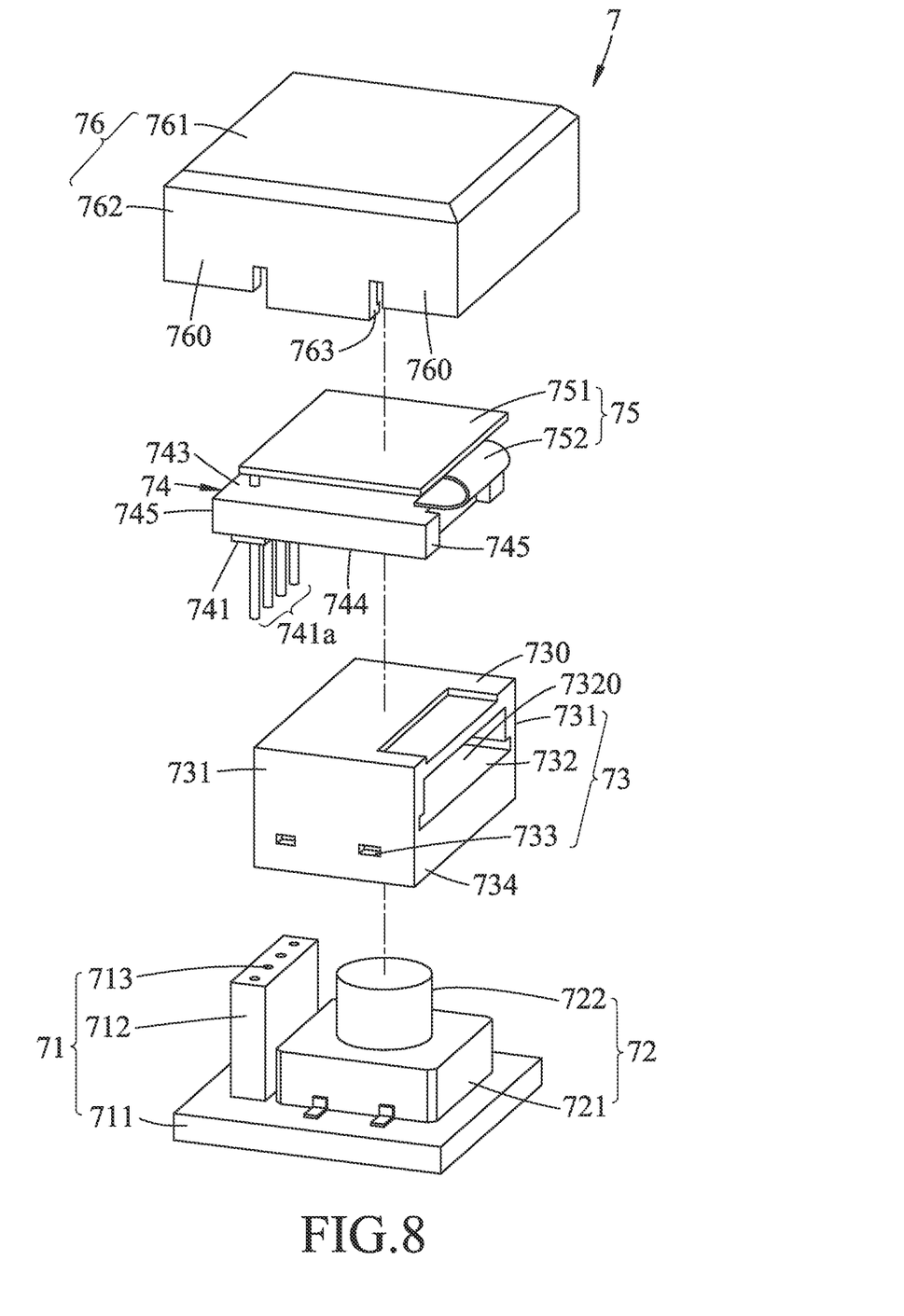
FIG. 8 is an exploded view illustrating the press button module of the embodiment.

Referring to FIGS. 7 and 8 in combination with FIG. 6, the press button modules 7 are disposed on the main circuit board 6 and spaced apart from each other. Each press button module 7 includes a sub-circuit board 71, a micro-contact switch 72, an auxiliary case 73, a driving circuit board 74, a display module 75, and a transparent cap 76.

The sub-circuit board 71 is electrically connected to the main circuit board 6. The sub-circuit board 71 has a circuitry plate 711 provided with a control circuit (not shown), and an electrical connector 712 electrically connected to the circuitry plate 711. In this embodiment, the control circuit of the circuitry plate 711 is electrically boned to the solder pad arrays 61 through corresponding solder pads (not shown) on a bottom surface of the circuitry plate 711. In addition, as shown in FIG. 8, the electrical connector 712 has a plurality of socket holes 713.

Figure 9:
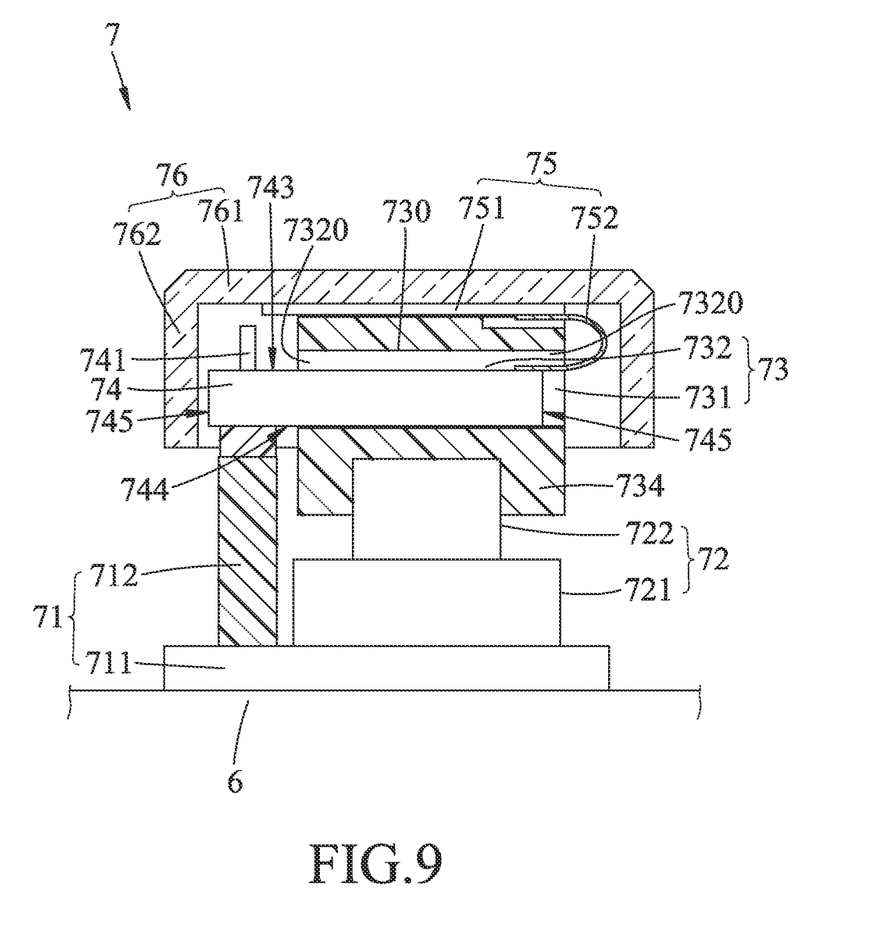
FIG. 9 is a partially sectioned view illustrating the press button module of the embodiment.
Figure 10:
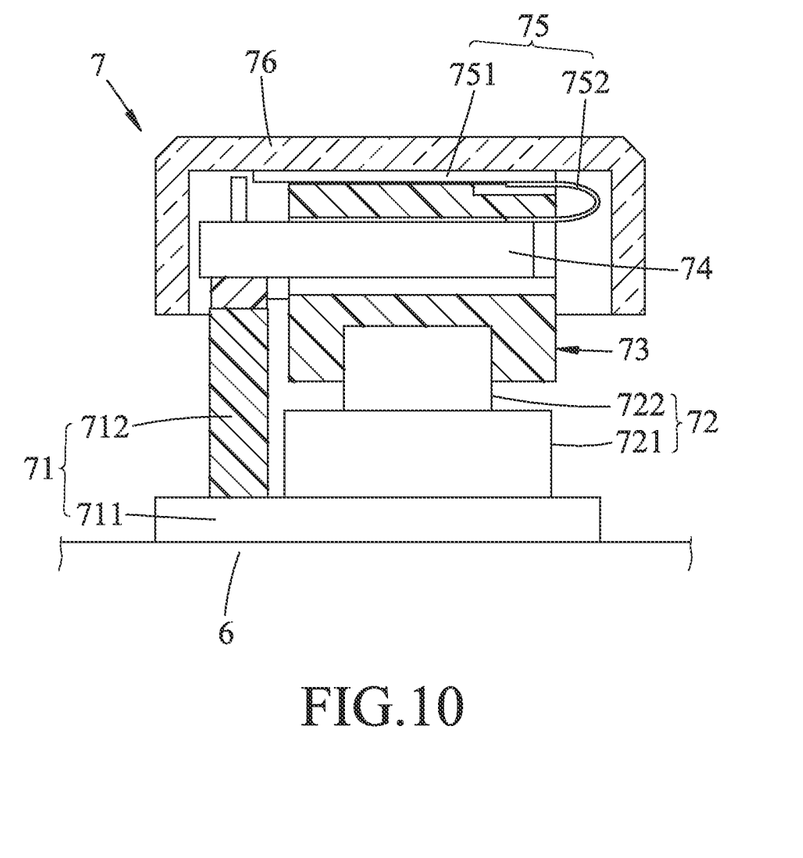
FIG. 10 is the same view as FIG. 9, but illustrating the press button module of the embodiment in a pressed state.
Figure 11:
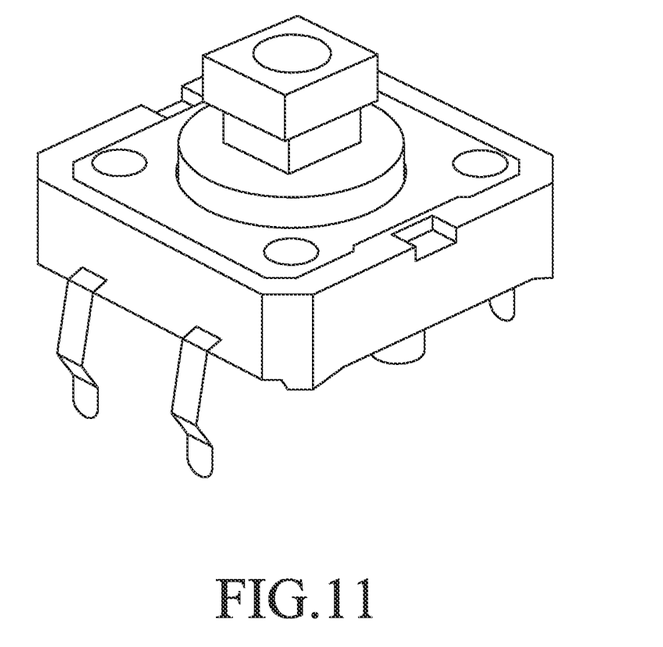
FIG. 11 illustrates a B3F-4050 mechanical key switch that is available from Omron Electronics Inc., and that is usable as a micro-contact switch of the press button module of the embodiment.

Referring to FIGS. 9 to 11 in combination with FIG. 8, the micro-contact switch 72 has a switch base 721 mounted on the sub-circuit board 71, and a plunger member 722 that protrudes upward from the switch base 721 and that is releasably engaged with the auxiliary case 73. In this embodiment, the micro-contact switch 72 may be a mechanical key switch (B3F-4050) available from Omron Electronics Inc. (see FIG. 11), but is not limited hereto.

Referring back to FIGS. 7 and 8, the auxiliary case 73 is removably mounted on top of and in contact with the micro-contact switch 72. In this embodiment, the auxiliary case 73 has a top wall 730, a bottom wall 734 and two opposite lateral walls 731 connected between the top and bottom walls 730, 734. The top, bottom, and lateral walls 730, 734, 731 define a receiving space 732. The lateral walls 731 has a plurality of first engaging elements 733. The plunger member 722 is engaged with a bottom surface of the bottom wall 734 (see FIG. 9).

Referring back to FIGS. 6 to 11, the driving circuit board 74 is removably disposed in the auxiliary case 73. The driving circuit board 74 has a mating connector 741 mating with the electrical connector 712 of the sub-circuit board 71 to establish an electrical connection with the main circuit board 6. In this embodiment, the receiving space 732 of the auxiliary case 73 has two opposite open ends 7320. The driving circuit board 74 is disposed in the receiving space 732, and has top and bottom surfaces 743, 744 respectively facing the top and bottom walls 730, 734 of the auxiliary case 73 (see FIG. 9), and two opposite lateral sides 745 exposed respectively from the open ends 7320. The mating connector 741 includes a plurality of pins 741a extending downwardly from one of the lateral sides 745 of the driving circuit board 74. The pins 741a are inserted respectively into the socket holes 713 of the electrical connector 712 so that the driving circuit board 74 is stationary and is electrically connected to the main circuit board 6 through the sub-circuit board 71. A height of the receiving space 732 between the top and bottom walls 730, 734 of the auxiliary case 73 is larger than a thickness between the top and bottom surfaces 743, 744 of the driving circuit board 74. As such, the auxiliary case 73 is movable upward and downward relative to the driving circuit board 74.

The display module 75 is removably disposed on top of the auxiliary case 73. The display module 75 includes a micro light emitting diode array 751, and a flexible circuit board 752 electrically bonded to the micro light emitting diode array 751 and the driving circuit board 74. The flexible circuit board 752 is bonded to the other one of the lateral sides 745 of the driving circuit board 74 away from the pins 741a. In this embodiment, the flexible circuit board 752 is configured to transmit a signal from the driving circuit board 74 to the micro light emitting diode array 751 for displaying an image. An example of the display module 75 may be one that is disclosed in Taiwanese Patent Application Number 108126000.

The transparent cap 76 covers the display module 75 and the auxiliary case 73, and is detachably connected to the auxiliary case 73. The transparent cap 76 has a top cap wall 761, a skirt wall 762 extending downward from the top cap wall 761 and covering the auxiliary case 73, and a plurality of second engaging elements 763 formed on the skirt wall 762 for engagement with the first engaging elements 733. In this embodiment, the first engaging elements 733 of the auxiliary case 73 are engaging holes formed in outer surfaces of the lateral walls 731. The second engaging elements 763 are engaging hooks. The skirt wall 762 of the transparent cap 76 is partially split to form two opposite resilient split parts 760 (only one is shown in FIG. 8) extending downwardly and respectively over the outer surfaces of the lateral walls 731 of the auxiliary case 73. The engaging hooks 763 project inwardly and respectively from bottom ends of the split parts 760 to engage the engaging holes 733. The transparent cap is made of a transparent material, such as a transparent acrylic, glass, and so on. The micro light emitting diode array 751 of The display module 75 is mounted on top of the top wall 730 of the auxiliary case 73 and lies beneath the top cap wall 761, so that the image displayed by the display module 75 can be clearly viewed through the top cap wall 761 of the transparent cap 76. In addition, as shown in FIG. 5, the transparent caps 76 of the press button modules 7 are partially exposed from the through holes 511.

Referring back to FIGS. 9 and 10, when the transparent cap 76 is not pressed, the micro-contact switch 72 opens the control circuit of the sub-circuit board 71. When the transparent cap 76 is pressed, the transparent cap 76 presses the auxiliary case 73, which in turn presses the micro-contact switch 72 so that the micro-contact switch 72 closes the control circuit of the sub-circuit board 71. In this embodiment, the plunger member 722 of the micro-contact switch 72 is biased to rise upward by a resilient force. As shown in FIG. 10, when the transparent cap 76 is pressed, the plunger member 722 and the auxiliary case 73 are pressed against the resilient force to move toward the sub-circuit board 71, and the micro-contact switch 72 closes the control circuit of the sub-circuit board 71, so that the sub-circuit board 71 can produce a command signal. As shown in FIG. 9, when the transparent cap 76 is released from a pressing force, the resilient force returns the plunger member 722, the auxiliary case 73 and the transparent cap 76, so that the micro-contact switch 72 can open the control circuit of the sub-circuit board 71.

Referring back to FIGS. 5 and 6, the signal transceiver unit 8 is electrically connected to the main circuit board 6 to transmit a signal out from the casing unit 5 and receive a signal from outside of the casing unit 5. The signal transceiver unit 8 may include, but is not limited to, a wi-fi module (not shown) or a Bluetooth module (not shown). By virtue of the signal transceiver unit 8, the multi-functional control device of the disclosure can control an electrical device signally coupled thereto.

The control unit 90 is mounted on the main circuit board 6, and is signally connected to the signal transceiver unit 8 and the press button modules 7 to receive and process the command signals from the press button modules 7 and input signals from the signal transceiver unit 8. Based on, but not limited to, a firmware loaded in the control unit 90, the control unit 90 feeds the processed signal to the signal transceiver unit 8 and the press button modules 7.

The power supply device 91 is disposed on the main circuit board 6 in proximity to a periphery of the casing unit 5. The power supply device 91 is configured to be connected to a power supply source (not shown) for supplying power to the main circuit board 6.

The activator unit 92 is disposed on the main circuit board 6 in proximity to the periphery of the casing unit 5, and is electrically connected to the control unit 90 and the power supply device 91. The activator 92 includes a power activator 921 and a signal activator 922. The power activator 921 is configured to activate or stop power supply to the main circuit board 6 for activating or deactivating operation of the multi-functional control device. The signal activator 922 is electrically connected to the signal transceiver unit 8 to activate or deactivate the signal transceiver unit 8.

The brightness adjustment unit 93 is disposed on the main circuit board 6 in proximity to the periphery of the casing unit 5 and signally connected to the control unit 90. The control unit 90 sends brightness signals from the brightness adjustment unit 93 to the display modules 75 of the press button modules 7 to adjust brightness of the images displayed on the display modules 75.

In other embodiments, the multi-functional control device of the disclosure may further include a reset member (not shown) disposed on the main circuit board 6 in proximity to the periphery of the casing unit 5 and signally connected to the control unit 90. Through the control unit 90, the reset member (not shown) can send a reset signal to the press button modules 7 to reset the press button modules 7 to original factory settings.

Figure 12:
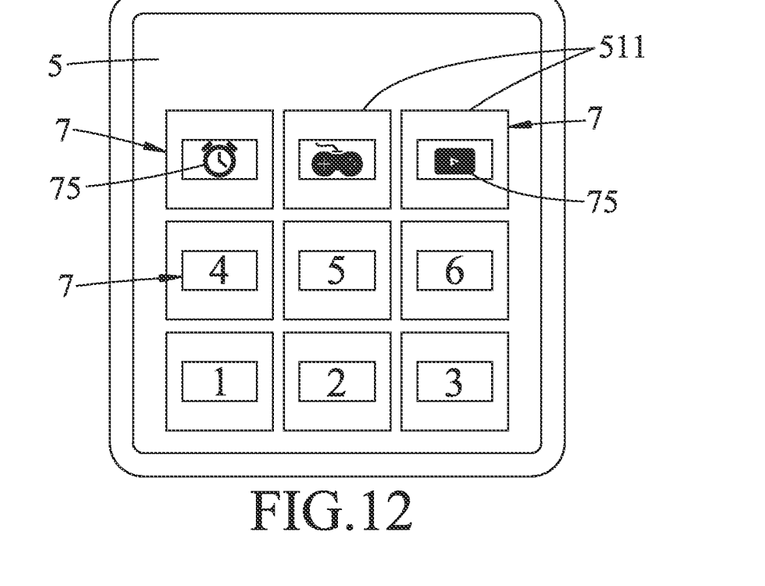
FIG. 12 is a top view of the embodiment illustrating the multi-functional control device in a selection mode.

As shown in FIG. 12, the top row of press button modules 7 reveals that the multi-functional control device can remotely control electronic devices, such as a video player, a game player and an electric alarm clock. The multi-functional control device can be a portable type or a wall mount type. When the multi-function control device is the wall mount type, an outer surface of the bottom casing part 52 has a hook or a hanging ring (not shown) to be mounted on a wall (not shown). The selection images displayed in FIG. 12 by the display modules 75 respectively represent a video player control mode (see FIG. 13), a game player control mode (see FIG. 14) and an electric alarm clock control mode (see FIG. 15). When the multi-functional control device is in use, the signal activator 922 activates the transceiver unit 8 to be signally connected to the video player, the game player and the electric alarm clock. When one of the press button modules 7 displaying the desired selection image is pressed, the multi-functional control device is switched into one of the video player control mode, the game player control mode and the electric alarm clock control mode.

Figure 13:
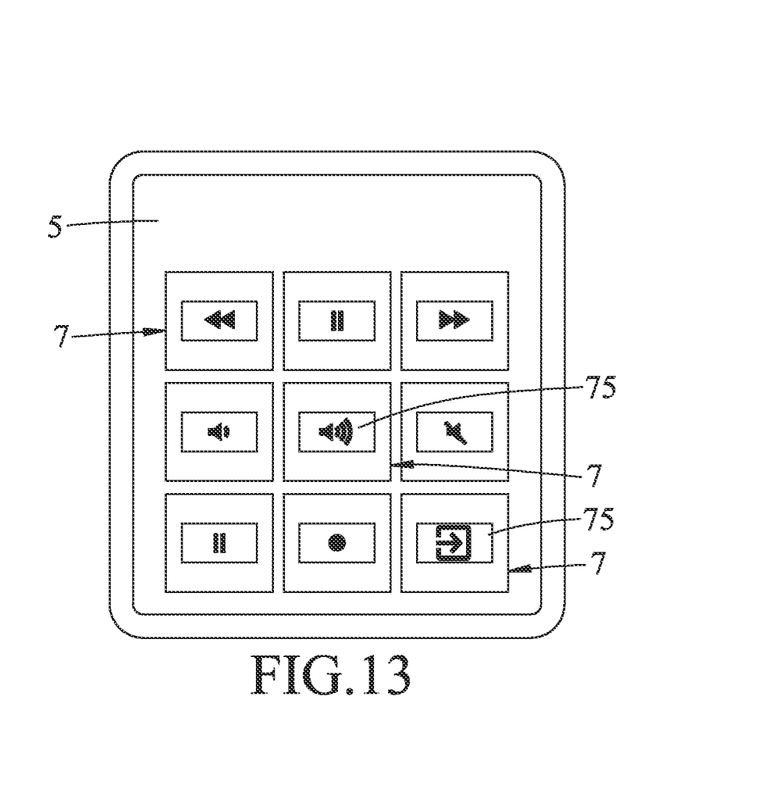
FIG. 13 is a top view of the embodiment illustrating the multi-functional control device switched to a video player control mode.

As shown in FIGS. 6, 9, 10, 12 and 13, when the press button module 7 that displays the selection image of the video player (see FIG. 12) is pressed, the corresponding micro-contact switch 72 is pressed to close the control circuit of the sub-circuit board 71, thereby producing a video player signal to the control unit 90. The control unit 90 processes the video player signal and produces multiple video player function signals to the display modules 75 through the driving circuit boards 74 and the mating connectors 741 of the press button modules 7. As shown in FIG. 13, the display modules 75 are switched to display the video player function images so that the multi-functional control device is switched to the video player control mode.

When the multi-functional control device is in the video player control mode, the middle one of the press button modules 7 represents a volume-up press button. As the volume-up press button is pressed, the control circuit of the sub-circuit board 71 is closed by the micro-contact switch 72 so that the sub-circuit board 71 transmits a volume-up signal to the signal transceiver unit 8 through the control unit 90 to turn up the volume of the video player. The press button module 7 at the right of the bottom row in FIG. 13 represents a return button. When the return button is pressed, the press button modules 7 are returned to the selection mode that reveals the selection images of the video player, the game player and the electric alarm clock as shown in FIG. 12.

Figure 14:
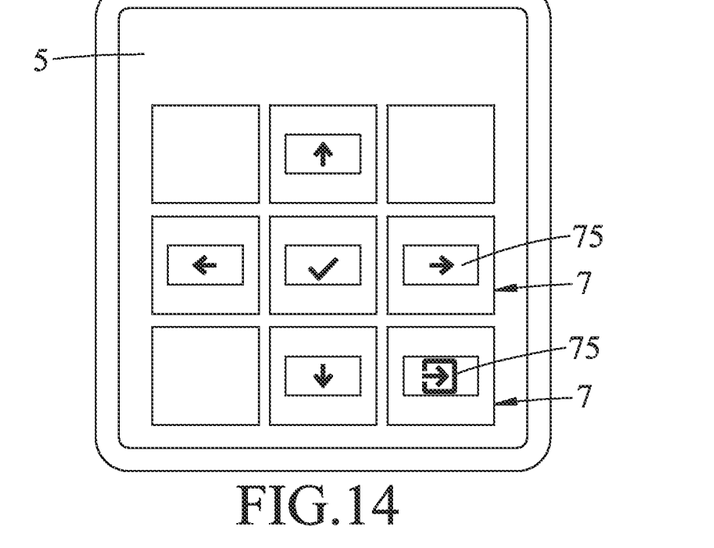
FIG. 14 is a top view of the embodiment illustrating the multi-functional control device switched to a game player control mode.
Figure 15:
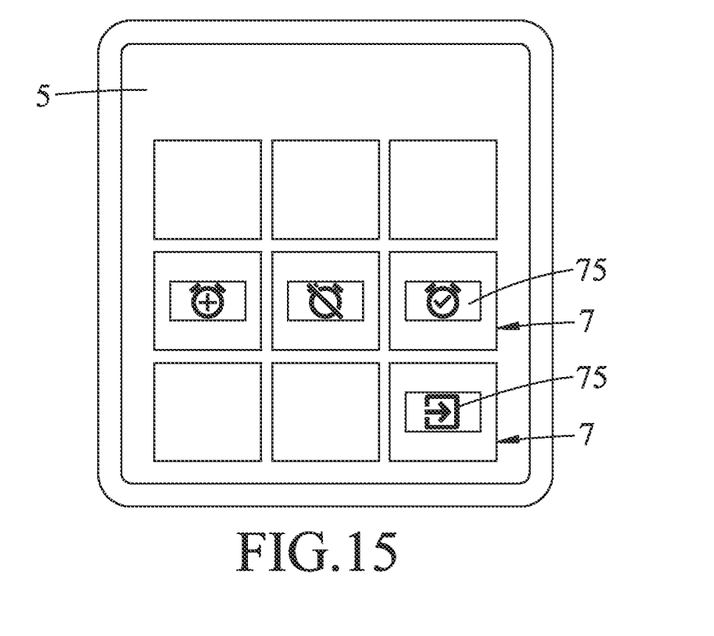
FIG. 15 is a top view of the embodiment illustrating the multi-functional control device switched to an electric alarm clock control mode.

Similarly, if the press button module 7 for the game player control mode, or clock alarm control mode (see FIG. 12) is pressed, the press button modules 7 may be switched to display the game player function images (see FIG. 14) or the clock alarm function images (see FIG. 15). In case, the return button at the right of the bottom row shown in FIG. 14 or 15 is pressed, the press button modules 7 are switched to return to the selection mode shown in FIG. 12.

Note that nine press button modules 7 are used in this embodiment (see FIG. 12). In addition to the three press button modules 7 for the video player control mode, the game player control mode and the electric alarm clock control mode, one or more of the remaining six press button modules 7 represented by numerals 1 to 6 may be used to establish additional control mode(s) as desired. Because nine press button modules 7 can be used to establish nine control modes to respectively control nine different electric devices, the multi-functional control device can be minimized in size and weight.

Because the driving circuit board 74 is detachably connected to the electrical connector 712 and because the auxiliary case 73 is detachably connected to the micro-contact switch 72, replacement of the display module 75 and the driving circuit board 74 is possible. When the display module 75 of one of the press button modules 7 is damaged, the transparent cap 76 can be first detached from the auxiliary case 73 so that the mating connector 741 of the driving circuit board 74 connected to the damaged display module 75 can be removed from the electrical connector 712 of the sub-circuit board 71 and the auxiliary case 73 together with the driving circuit board 74 can be detached from the micro-contact switch 72. Afterwards, a new driving circuit board 74 and a new display module 75 for replacement can be assembled with the sub-circuit board 71 and the auxiliary case 73, and the auxiliary case 73 can be reassembled with the micro-contact switch 72.

Compared to the third or fourth conventional multi-functional control devices shown in FIG. 3 or 4, which has irreplaceable press button assemblies 321 or key display units 41, the multi-functional control device of the disclosure can have a prolonged service life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multi-functional control device with display buttons, comprising,
    a casing unit;
    a main circuit board disposed within said casing unit; and
    a plurality of press button modules disposed on said main circuit board and spaced apart from each other, each of said press button modules including
        a sub-circuit board electrically connected to said main circuit board, said sub-circuit board having a circuitry plate provided with a control circuit, and an electrical connector electrically connected to said circuitry plate,
        a micro-contact switch mounted on said sub-circuit board,
        an auxiliary case removably mounted on top of and in contact with said micro-contact switch,
        a driving circuit board removably disposed in said auxiliary case, and having a mating connector mating with said electrical connector of said sub-circuit board to establish an electrical connection with said main circuit board,
        a display module removably disposed on top of said auxiliary case, said display module including a micro light emitting diode array, and a flexible circuit board electrically bonded to said micro light emitting diode array and said driving circuit board, said flexible circuit board being configured to transmit a signal from said driving circuit board to said micro light emitting diode array for displaying an image, and
        a transparent cap covering said display module and said auxiliary case, and detachably connected to said auxiliary case,
    wherein, when said transparent cap is not pressed, said micro-contact switch opens said control circuit of said sub-circuit board, and
    wherein, when said transparent cap is pressed*, said transparent cap presses said auxiliary case, which in turn presses said micro-contact switch so that said micro-contact switch closes said control circuit of said sub-circuit board.

2. The multi-functional control device as claimed in claim 1, wherein:
    said electrical connector has a plurality of socket holes;
    said mating connector includes a plurality of pins inserted respectively into said socket holes so that said driving circuit board is electrically connected to said main circuit board through said sub-circuit board; and
    said driving circuit board is stationary, and said auxiliary case is movable upward and downward relative to said driving circuit board.

3. The multi-functional control device as claimed in claim 2, wherein said micro-contact switch has a switch base mounted on said sub-circuit board, and a plunger member that protrudes upward from said switch base and that is releasably engaged with said auxiliary case.

4. The multi-functional control device as claimed in claim 3,
    wherein said plunger member is engaged with a bottom surface of said auxiliary case;
    wherein said plunger member is biased to rise upward by a resilient force, said plunger member and said auxiliary case being pressed against the resilient force when said transparent cap is pressed, the resilient force returning said plunger member, said auxiliary case and said transparent cap when said transparent cap is released from a pressing force.

5. The multi-functional control device as claimed in claim 2, wherein:

said auxiliary case has a top wall, a bottom wall and two opposite lateral walls connected between said top and bottom walls, said top, bottom, and lateral walls defining a receiving space, said lateral walls having a plurality of first engaging elements; and said transparent cap has a top cap wall, a skirt wall extending downward from said top cap wall and covering said auxiliary case, and a plurality of second engaging elements formed on said skirt wall for engagement with said first engaging elements.

6. The multi-functional control device as claimed in claim 5, wherein said first engaging elements are engaging holes formed in outer surfaces of said lateral walls, and said second engaging elements are engaging hooks to engage said engaging holes.

7. The multi-functional control device as claimed in claim 6, wherein said skirt wall of said transparent cap is partially split to form two opposite resilient split parts extending downwardly and respectively over said outer surfaces of said lateral walls, said engaging hooks projecting inwardly and respectively from bottom ends of said split parts.

8. The multi-functional control device as claimed in claim 7, wherein said receiving space has two opposite open ends, said driving circuit board being disposed in said receiving space and having top and bottom surfaces respectively facing said top and bottom walls, and two opposite lateral sides exposed respectively from said open ends, said pins of said mating connector extending downwardly from one of said lateral sides of said driving circuit board, a distance between said top and bottom walls of said auxiliary case being larger than a thickness between said top and bottom surfaces of said driving circuit board.

9. The multi-functional control device as claimed in claim 8, wherein said flexible circuit board is bonded to the other one of said lateral sides of said driving circuit board, said display module being mounted on top of said top wall of said auxiliary case and lying beneath said top cap wall.

10. The multi-functional control device as claimed in claim 1, wherein said casing unit includes a top casing part and a bottom casing part connected to each other, said top casing part having a plurality of through holes;

said main circuit board is situated on said bottom casing part; and said transparent caps of said press button modules are partially exposed from said through holes.

11. The multi-functional control device as claimed in claim 1, further comprising a signal transceiver unit and a control unit, said signal transceiver unit being electrically connected to said main circuit board to transmit a signal out from said casing unit and receive a signal from outside of said casing unit, said control unit being mounted on said main circuit board, and signally connected to said signal transceiver unit and said press button modules.

12. The multi-functional control device as claimed in claim 7, further comprising a power supply device disposed on said main circuit board in proximity to a periphery of said casing unit, said power supply device being configured to be connected to a power supply source for supplying power to said main circuit board.

13. The multi-functional control device as claimed in claim 8, further comprising an activator unit disposed on said main circuit board in proximity to the periphery of said casing unit, said activator unit being electrically connected to said control unit and said power supply device, and including a power activator and a signal activator, said power activator being configured to activate or stop power supply to said main circuit board for activating or deactivating operation of said multi-functional control device, said signal activator being electrically connected to said signal transceiver unit to activate or deactivate said signal transceiver unit.

14. The multi-functional control device as claimed in claim 8, further comprising a brightness adjustment unit disposed on said main circuit board in proximity to the periphery of said casing unit and signally connected to said control unit, said control unit sending brightness signals from said brightness adjustment unit to said display modules of said press button modules to adjust brightness of the image displayed on said display modules.

\* \* \* \* \*